Nov. 20, 1934.  E. R. FROST  1,981,167
DRIVING MECHANISM
Filed March 17, 1932   3 Sheets-Sheet 2

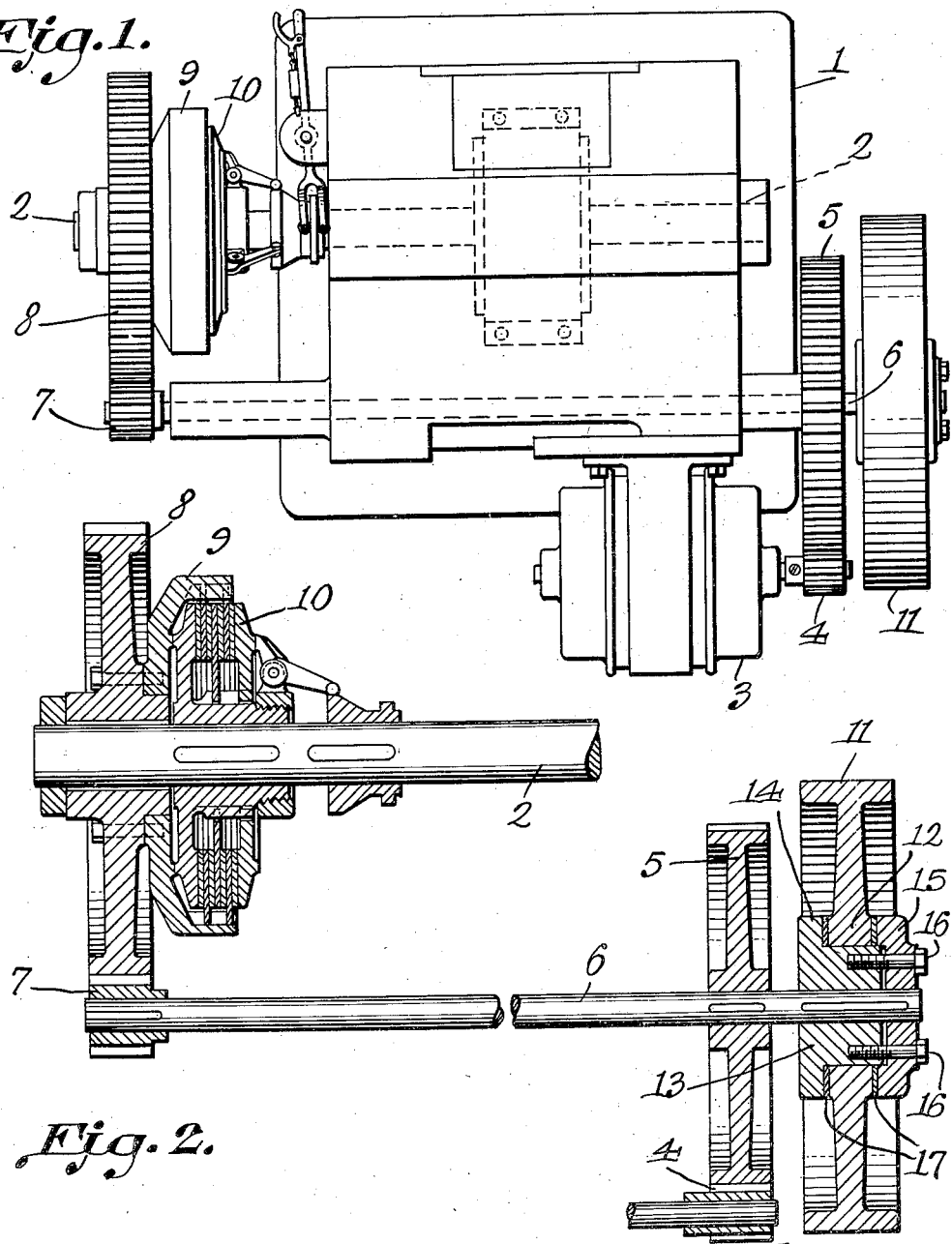

Earl R. Frost Inventor

Nov. 20, 1934.    E. R. FROST    1,981,167
DRIVING MECHANISM
Filed March 17, 1932    3 Sheets-Sheet 3

Earl R. Frost  Inventor

By C. A. Snow & Co.
Attorneys.

Patented Nov. 20, 1934

1,981,167

UNITED STATES PATENT OFFICE

1,981,167

DRIVING MECHANISM

Earl R. Frost, Tiffin, Ohio, assignor to The National Machinery Company, Tiffin, Ohio Application March 17, 1932, Serial No. 599,510

2 Claims. (Cl. 74—411)

This invention relates to driving mechanism for use with metal working machines such as presses, forging machines, etc., and with ore crushers, and other machines having movable members subject to sudden stalling due to unyielding resistance by materials being acted upon.

When a machine of any of the types mentioned has become stalled due to overloading, the high pressures on the working parts due to the momentum of the fly wheel have obviously caused breakage unless some means has been utilized for permitting slippage. One such means has been a friction clutch for starting and stopping the mechanism. However it is not possible to produce a friction clutch with a known, constant driving torque ability and, therefore, there is no way in which to determine the slippage, if any, when the machine stalls. A friction clutch has a very variable driving torque ability, all depending on the nature of the clutch plate surfaces, temperature, adjustment, and other conditions beyond control. As there is no way to determine whether or not the clutch has slipped, it is impossible to ascertain what machine pressures have been developed.

Should a friction clutch be made oversize there would be no safety factor in the machine and should the flywheel establish too high pressures on the working parts in the event of an overload, the lack of slippage would result in breakage.

Should the friction clutch be made to do a rated capacity, repeated adjustments would be necessary in order to maintain the desired capacity. This could not be done quickly with any degree of accuracy and, therefore, such an arrangement would not be practical.

Where friction clutches have been used there have been very serious breakages and where accidents have not occurred there have been bad delays on account of the intricacies of adjustment. The burning out of the friction clutches has been the rule rather than the exception.

It is very desirable that a friction clutch be used instead of a pin clutch or other similar coupling means because of the quick but gradual pick up possible therewith, and because of its effectiveness, strength, and ease of operation.

One of the objects of the present invention is to provide a driving mechanism which utilizes a friction clutch and also compensates automatically for the high pressures developed by the flywheel, by permitting slippage when the machine is overloaded, this action taking place without any of the disadvantages herein mentioned.
It is a further object to utilize driving mechanism having a friction clutch but providing a constant and positive torque ability by the use of an easily controlled friction slip, properly placed, it thus being possible to employ a friction clutch which is oversize to insure the necessary positive drive without the usual danger of breakage due to overloading.

A still further object is to arrange a friction slip in the driving train which can be marked so that any slippage occurring can be noted and it becomes possible immediately to determine when the machine is being worked beyond a safe limit.

It is a well known fact that where a pressure machine is operated by a friction clutch there is no way to tell whether the clutch is delivering the requisite amount of torque in order to cause the machine to properly perform its function. When the clutch starts to slip more easily, as they generally do on account of the glazing or polishing effect which results from the constant slipping at the time they are engaged and disengaged, then it prevents the machine from performing its operation, and the user is in serious difficulty because he does not known whether the machine's failure is on account of the slipping of the clutch, or because of the size of the forging that he is making, the temperature at which the forging is being worked, or whether the design of the dies and tools may be such as to cause excessive strains upon the machine.

It is an object of this invention to provide a friction slip which will act as a "telltale" to indicate the facts. If a machine is equipped with the combination of a friction slip and a friction clutch, then the friction slip on the flywheel is adjusted to the point of its ability to produce the forging or insure the proper performance of the machine, so that if the machine for any reason refuses to continue doing what it has previously been doing, then the user can almost be certain that the trouble lies in the fact that the friction clutch was worn or the friction disks have glazed so that it slips too easily. This ability of the friction slip to act as a "telltale" on the performance of the friction clutch is a marked advantage of the invention.

With the foregoing and other objects in view which will appear as the description proceeds, the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings:

Figure 1 is a plan view of a press equipped with the present improvements.

Figure 2 is a horizontal section through the driving train shown in Figure 1.

Figure 5:
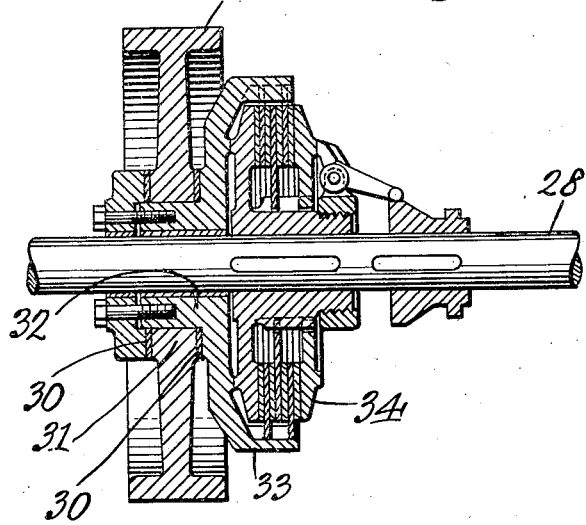

Figure 5 is a section through a combined flywheel slip and friction clutch.

Figure 6:
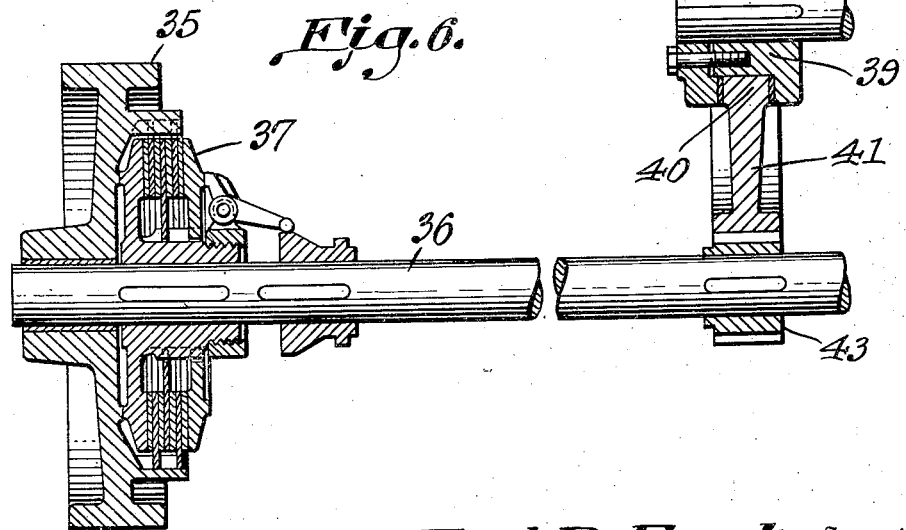

Figure 6 is a section through a driving train in which the friction clutch is located at the flywheel and the friction slip is provided at one of the gears.

In carrying out the invention it is possible to incorporate the improvements in many different ways in order to meet different conditions. In the drawings several different installations have been illustrated. For example, in Figure 1 there has been shown a press 1 the driven shaft 2 of which is adapted to operate a slide employed for shaping metal. Such a structure has been shown in detail in the copending application of William L. Clouse, Cold press, filed April 1, 1931, Serial Number 526,991. A motor 3 has a gear 4 which operates an intermediate gear 5 on a jack-shaft 6. Another gear 7 on this shaft drives a gear 8 which is loose on shaft 2 and has a friction clutch member 9 rotatable with it. A shiftable friction clutch member 10 is carried by and rotates with shaft 2. The friction clutch 9—10 thus provided is oversize so that when in use it will not slip because of any overloading to which the machine might be subjected. By operating this clutch the shaft 2 can be started and stopped at will, as will be apparent.

As before explained the use of an oversize friction clutch in a driving train including a flywheel has not been practical. In order to permit such use there is here provided a flywheel 11 having an outer hub member 12 and an inner hub member 13. The member 13 is secured to jack-shaft 6 so as to rotate therewith and has an annular flange 14 at one end. A plate 15 is secured to its other end by adjusting screws 16 and interposed between the outer hub member 12 and flange 14 and plate 15 are friction rings 17. Thus a friction slip connection is provided between the jack-shaft and the flywheel and said connection can be regulated by screws 16.

Figure 3:
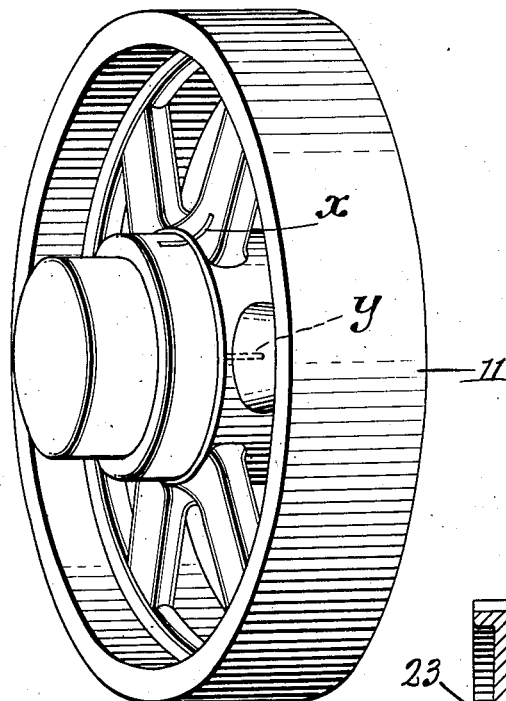
Figure 3 is a perspective view of the flywheel slip.

Obviously the friction slip can be adjusted to operate only when the machine passes its rated load capacity. Therefore should the mechanism be stalled from any cause, the flywheel will not be brought to a sudden stop but will rotate about the jack-shaft until the resistance offered by the friction slip brings it to a stop. By placing a chalk-mark X or the like on the hub members any slippage can be detected instantly by the shifting of a portion of the mark as shown at y in Figure 3. Thus it can be determined immediately when the machine is being worked beyond its limit.

Figure 4:
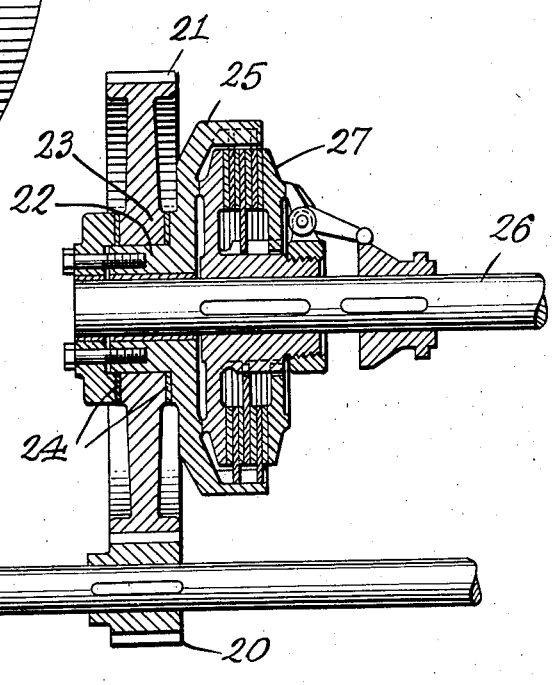
Figure 4 is a section through a modified form of driving train showing the clutch located at one of the gears of the train.

As before stated the locations of the friction clutch and the friction slip can be varied. In Figure 4, for example, the flywheel 18 is fixedly connected to jack-shaft 19 and a gear 20 on the jack-shaft drives gear 21 with an inner hub member 22 and an outer hub member 23. A friction slip 24 like the one shown in Figure 2, is interposed between the hub members. A clutch member 25 is carried by the inner hub member which is rotatable on driven shaft 26 while a shiftable clutch member 27 is secured to shaft 26.

In this construction should the machine be subjected to an overload the momentum of the flywheel 18 will continue to drive gears 20 and 21 and cause gear 21 to slip until brought to a stop by friction.

Obviously instead of locating the friction clutch and the friction slip at different points they both can be combined with the flywheel, as in Figure 5. Here the jack-shaft 28 carries the flywheel 29 which has a friction slip 30 between the outer hub member 31 and the inner hub member 32. The inner hub member is rotatable on the shaft and carries clutch member 33 while the shiftable clutch member 34 rotates with shaft 28. In this structure the oversize friction clutch provides a connection between the flywheel and the shaft which, however, will not interfere with the action of the friction slip when the machine is overloaded.

In Figure 6 the flywheel 35 is coupled to jack-shaft 36 by an oversize friction clutch 37 while a friction slip 38 is provided between the hub members 39 and 40 of the gear 41 on driven shaft 42.

In all of the structures described it is possible to work the machine to its limit without the hazards due to overloading. This has not been possible heretofore where a friction clutch has been used.

Furthermore there is provided a constant and positive torque ability by virtue of the easily controlled conditions existing in the friction-slip as compared to the irregular, indefinite and uncontrollable ability of the friction clutch. By making the friction clutch large in relation to the flywheel frictional area, it is obvious that the machine will have a uniform ability.

While in Figure 6 a friction clutch has been shown between the fly-wheel and its shaft it is to be understood that it could be located between said shaft and the pinion 43 or at any suitable point. This and other modifications are so obvious that further illustration is not deemed necessary.

While the fly-wheel has been shown and described in some of the structures as an element driven by the train it is to be understood that in many cases the flywheel can be used to operate the train.

What is claimed is:

1. In a metal working machine a movable work engaging portion, a drive mechanism therefor including a flywheel, a friction clutch connecting the flywheel to the drive mechanism, there being means included in said mechanism remote from said flywheel and controlled by the flywheel for indicating the location of a fault when the machine is stalled or overloaded, said means including a gear and a slip coupling, the said coupling being designed to carry a predetermined load, one of the members of the coupling being rotatable by the flywheel relative to the other member when subjected to an overload.

2. In a metal working machine a ram mounted for reciprocation, a drive mechanism therefor including a flywheel, an oversize friction clutch connecting the flywheel to the drive mechanism and adapted to overcome overloads, there being means included in said mechanism remote from said flywheel for indicating the location of a fault when the machine is stalled or overloaded, said means including a gear and a slip coupling designed to carry a predetermined load, one of the members of the coupling being rotatable by the flywheel relative to the other member when subjected to an overload.

EARL R. FROST.